(12) United States Patent
Tsuchiya et al.

(10) Patent No.: US 10,461,613 B2
(45) Date of Patent: Oct. 29, 2019

(54) STATOR AND STATOR MANUFACTURING METHOD

(71) Applicant: TOYOTA JIDOSHA KABUSHIKI KAISHA, Toyota-shi, Aichi-ken (JP)

(72) Inventors: Yukio Tsuchiya, Toyota (JP); Hiroyuki Hattori, Okazaki (JP)

(73) Assignee: TOYOTA JIDOSHA KABUSHIKI KAISHA, Toyota (JP)

( * ) Notice: Subject to any disclaimer, the term of this patent is extended or adjusted under 35 U.S.C. 154(b) by 317 days.

(21) Appl. No.: 15/101,765

(22) PCT Filed: Dec. 22, 2014

(86) PCT No.: PCT/IB2014/002857
§ 371 (c)(1),
(2) Date: Jun. 3, 2016

(87) PCT Pub. No.: WO2015/097530
PCT Pub. Date: Jul. 2, 2015

(65) Prior Publication Data
US 2016/0380521 A1    Dec. 29, 2016

(30) Foreign Application Priority Data

Dec. 26, 2013  (JP) ................................ 2013-270027

(51) Int. Cl.
*H02K 15/10*    (2006.01)
*H02K 15/085*   (2006.01)
(Continued)

(52) U.S. Cl.
CPC .......... *H02K 15/085* (2013.01); *H02K 1/04* (2013.01); *H02K 1/165* (2013.01); *H02K 3/325* (2013.01);
(Continued)

(58) Field of Classification Search
CPC .. H02K 3/46; H02K 3/48; H02K 1/12; H02K 7/10; H02K 3/28; H02K 15/022
(Continued)

(56) References Cited

U.S. PATENT DOCUMENTS

| 8,063,518 B2* | 11/2011 | Asai ....................... H02K 3/325 310/208 |
| 2007/0176511 A1 | 8/2007 | Sakai et al. |
| 2008/0157610 A1* | 7/2008 | Watanabe .............. H02K 3/522 310/43 |
| 2008/0191576 A1* | 8/2008 | Miyashita .............. H02K 3/522 310/194 |

(Continued)

FOREIGN PATENT DOCUMENTS

| CN | 100568666 C | 12/2009 |
| EP | 2597755 A1 | 5/2013 |

(Continued)

OTHER PUBLICATIONS

JP2004248471A machine translation Sep. 22, 2018.*

*Primary Examiner* — Mang Tin Bik Lian
*Assistant Examiner* — Leda T Pham
(74) *Attorney, Agent, or Firm* — Oliff PLC

(57) ABSTRACT

A stator includes a stator core and an insulator. The insulator includes a main body and a wall. An adhesive is attached to a portion of a triangular gap between the wall of the insulator and a yoke of the stator core. The adhesive is expandable, and adheres and fixes the insulator to the stator core by expanding to fill in the gap by being heated. Also, a stator manufacturing method includes attaching an adhesive to the wall of the insulator or an inside wall of the yoke, installing the insulator on a tooth, and heating the stator core and the insulator.

6 Claims, 5 Drawing Sheets

(51) Int. Cl.
*H02K 3/32* (2006.01)
*H02K 3/52* (2006.01)
*H02K 15/12* (2006.01)
*H02K 1/04* (2006.01)
*H02K 1/16* (2006.01)
*H02K 3/34* (2006.01)

(52) U.S. Cl.
CPC ............. *H02K 3/345* (2013.01); *H02K 3/522* (2013.01); *H02K 15/10* (2013.01); *H02K 15/12* (2013.01)

(58) Field of Classification Search
USPC ................................... 310/71, 194, 214, 215
See application file for complete search history.

(56) References Cited

U.S. PATENT DOCUMENTS

| | | | |
|---|---|---|---|
| 2009/0302694 A1 | | 12/2009 | Asai |
| 2010/0189972 A1 | * | 7/2010 | Tate ...................... B29C 44/445 |
| | | | 428/213 |
| 2013/0300248 A1 | | 11/2013 | Ishida et al. |
| 2014/0015349 A1 | * | 1/2014 | Chamberlin ........... H02K 3/345 |
| | | | 310/43 |

FOREIGN PATENT DOCUMENTS

| | | | |
|---|---|---|---|
| JP | 2001-157387 A | | 6/2001 |
| JP | 2004248471 A | * | 9/2004 |
| JP | 2007-151362 A | | 6/2007 |
| JP | 2007-215335 A | | 8/2007 |
| JP | 2008-160938 A | | 7/2008 |
| JP | 2013-236468 A | | 11/2013 |

* cited by examiner

STATOR AND STATOR MANUFACTURING METHOD

BACKGROUND OF THE INVENTION

1. Field of the Invention

The invention relates to stator used in a rotary electric machine, and a manufacturing method of this stator.

2. Description of Related Art

Conventionally, a stator of a rotary electric machine is provided with conductive stator core, and an insulator that insulates the conductive stator core from coils that are wound around teeth of the stator core.

For example, Japanese Patent Application Publication No. 2008-160938 (JP 2008-160938 A) describes a split core that forms a stator core of an electric motor, in which an insulator is integrally formed with the split core by insert-molding thermoplastic resin on teeth having a constant width and the surface of a yoke, that is connected to the teeth.

In JP 2008-160938 A, the insulator is formed by insert-molding, so an outer diameter side wall of the insulator is formed in a shape that follows the yoke of the stator core.

In contrast to this, if an insulator having an outer diameter side wall of the teeth having a shape that does not follow the shape of the yoke is inserted from a tip end side of the teeth and fixed by an adhesive, a method for stably fixing the insulator to the teeth is necessary.

SUMMARY OF THE INVENTION

The invention thus provides a stator capable of stably fixing an insulator having a shape that does not follow the yoke to the stator core, as well as a manufacturing method of the stator.

One aspect of the invention relates to a stator that includes a i) a stator core including a yoke that extends in a circumferential direction, teeth that protrude from the yoke in a radial direction, and a slot being defined between the teeth which are adjacent to each other; ii) an insulator that is assembled to each tooth from a tip end of the tooth, the insulator including a main body within which the tooth is housed, and a wall that protrudes in a direction orthogonal to the radial direction from an end portion of the main body, a circumferentially end portion of the wall being-configured to abut against an inside surface of the yoke in the slot; iii) a coil that is wound around the main body of the insulator; and iv) an adhesive that is attached to a portion of a triangular gap between the yoke and the wall of the insulator, the adhesive being expandable, the adhesive being configured to adhere and fix the insulator to the stator core by expanding to fill in the gap by being heated.

Another aspect of the invention relates to a manufacturing method for a stator, the stator including a stator core and an insulator, the stator core including a yoke that extends in a circumferential direction and teeth that protrude from the yoke in a radial direction, a slot being defined between the teeth which are adjacent to each other, the insulator including a wall and a main body around which a coil is wound, the wall protruding in a direction substantially orthogonal to the radial direction from an end portion of the main body. The manufacturing method includes preparing the stator core and the insulator; attaching an adhesive to the wall of the insulator or an inside surface of the yoke; installing the insulator on the tooth so as to form a triangular gap between the wall and the yoke, by abutting a circumferentially end portion of the wall of the insulator against the inside surface of the yoke in the slot; and heating the stator core and the insulator in order to adhere and fix the insulator to the stator core by expanding the adhesive to fill in the gap.

With the stator and stator manufacturing method according to the invention, the insulator is fixed by the adhesive expanding to fill in the gap formed between the yoke and the wall of the insulator having a shape that does not follow the yoke. Thus, even if there is some variation in the positon where the adhesive is attached or the amount of adhesive that is used, the insulator is still able to be stably fixed.

Also, the expanding adhesive is provided only in the gap formed between the yoke and the wall of the insulator, and is not provided between the tooth and the main body of the insulator. Therefore, when the insulator is inserted and arranged around the tooth, the adhesive will not contact the surface of the tooth or the inside surface of the main body of the insulator and peel off. Moreover, the amount of adhesive used to fix the insulator is able to be reduced, so cost is able to be reduced.

BRIEF DESCRIPTION OF THE DRAWINGS

Features, advantages, and technical and industrial significance of exemplary embodiments of the invention will be described below with reference to the accompanying drawings, in which like numerals denote like elements, and wherein.

DETAILED DESCRIPTION OF EMBODIMENTS

Hereinafter, example embodiments of the invention will be described in detail with reference to the accompanying drawings. In the description, the specific shapes, materials, numeric values, and directions and the like are merely examples to facilitate understanding of the invention, and may be changed as appropriate according to the use, objective, and specifications and the like. Also, when the description includes a plurality of example embodiment or modified examples or the like, the use of the characteristic portions thereof in appropriate combinations is initially intended.

Figure 1:
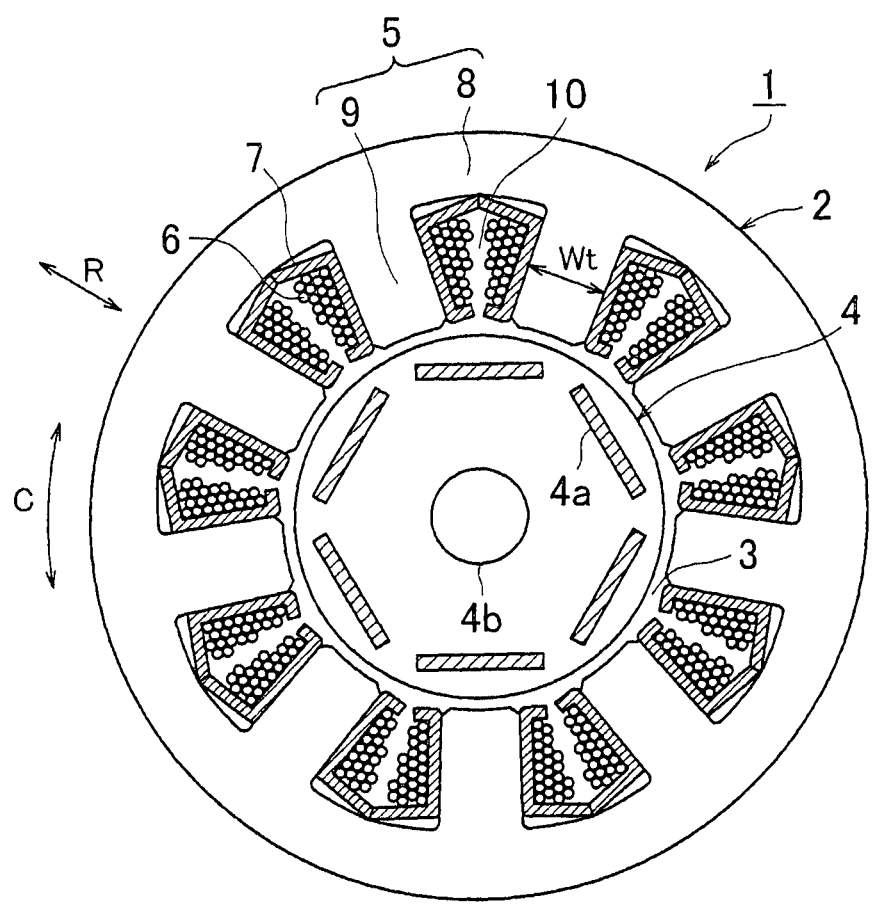
FIG. 1 is a sectional view of a rotary electric machine that includes a stator according to one example embodiment of the invention, taken along a direction orthogonal to the axial direction of the rotary electric machine.

FIG. 1 is a sectional view of a rotary electric machine 1 that includes a stator according to one example embodiment of the invention, taken along a direction orthogonal to the axial direction of the rotary electric machine 1. In FIG. 1, a radial direction is indicated by arrow R, and a circumferential direction is indicated by arrow C. Also, the axial direction is a direction perpendicular to the paper on which FIG. 1 is drawn.

The rotary electric machine 1 includes a generally cylindrical stator 2, and a rotor 4 provided to a radially inside of the stator 2 via a gap 3. The rotor 4 is rotatably supported, via a shaft 4b that is centrically fixed, by a case, not shown, within which the rotary electric machine 1 is housed. The rotor 4 shown in FIG. 1 has built-in permanent magnets 4a, but the rotor may also be a type that does not have permanent magnets.

The stator 2 includes a stator core 5, a coil 6 wound around the stator core 5, and an insulator 7 that insulates the stator core 5 from the coil 6.

The stator core 5 is a stacked body of magnetic plates that is formed by, for example, a large number of magnetic steel sheets that have been punched out into a generally annular shape, stacked together, and then integrally connected by crimping or welding or the like. The stator core 5 has a generally annular yoke 8, and a plurality of teeth 9 that protrude from the radially inner side of the yoke 8 and formed at predetermined intervals in the circumferential direction. As a result, groove-shaped slots 10 are formed open to both sides in the axial direction as well as to the radially inner side, between adjacent teeth 9 in the circumferential direction. Also, in this example embodiment, the teeth 9 are formed with a constant width Wt in a direction orthogonal to the radial direction. In this example embodiment, these teeth 9 may be referred to in the singular to facilitate understanding of the invention.

In this example embodiment, the stator core 5 is integrally formed as an annular magnetic plate stacked body, but the stator core 5 may alternatively be a split core that is formed by split core pieces in which the yoke 8 is divided at predetermined intervals in the circumferential direction on both sides of the teeth 9. In this case, the split core pieces are generally T-shaped in a plan view, by the generally arc-shaped yoke and the teeth. The stator core may be formed by arranging these split core pieces in a circle, and integrally connecting them by shrink-fitting a cylindrical case around the outer peripheral side of these split core pieces, or press-fitting them into a cylindrical case or the like. Also, the stator core 5 may be formed as a powder magnetic core in which resin-coated magnetic powder has been compression molded in a forming die.

The coils 6 are formed by, for example, windings made of insulation-coated copper wire that are wound around the insulator 7. In this example embodiment, the coils 6 are wound in concentrated windings around each of the teeth 9. Also, a cross-section of the windings that form the coils 6 may be circular or angular.

The insulator 7 serves to electrically insulate the stator core 5 from the coils 6. In this example embodiment, the insulator 7 also serves to fix the coils 6 to the stator core 5. The insulator 7 is made of insulating resin. More specifically, the insulator 7 is preferably made of thermoplastic resin such as polyphenylene sulfide (PPS), for example.

Figure 2:
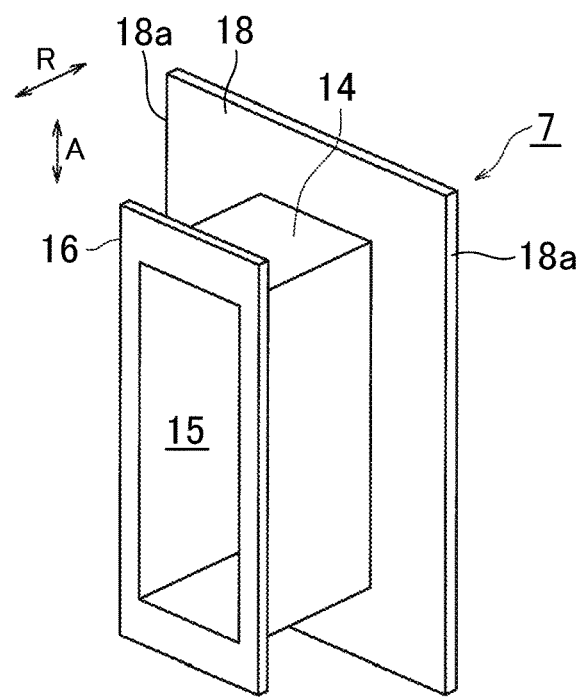
FIG. 2 is a perspective view of an insulator.

FIG. 2 is a perspective view of the insulator 7. In FIG. 2, the axial direction is indicated by arrow A. The insulator 7 has a main body that has a rectangular tubular shape, a radially inner side wall 16, and a radially outer side wall 18. The radially inner side wall 16 protrudes in a flange shape from an end portion on the radially inner side of the main body 14, and the radially outer side wall 18 protrudes in a flange shape from an end portion on a radially outer side of the main body 14. The insulator 7 may be integrally formed with a forming die using thermoplastic resin.

The main body 14 of the insulator 7 forms a bobbin for winding the coils 6 in an insulated state around the teeth 9. An inside space 15 of the main body 14 of the insulator 7 is formed of a size and shape that enables the teeth 9 to be housed with substantially no gaps. Therefore, when the insulator 7 is arranged around the teeth 9, an inner peripheral surface of the main body 14 is arranged in close contact with the outer peripheral surface of the teeth 9, such that the circumferential position of the insulator 7 is determined.

The radially inner side wall 16 and the radially outer side wall 18 of the insulator 7 are each formed so as to form a rectangular frame. Also, in this example embodiment, the radially inner side wall 16 and the radially outer side wall 18 are formed extending in a direction substantially orthogonal to the radial direction. Here, "substantially orthogonal" does not have to exactly match 90°, and may be set to a given angle within an angular range that includes 90°. Moreover, the radially inner side wall 16 is formed smaller than the radially outer side wall 18 so as not to interfere with the adjacent insulator 7 in the circumferential direction.

Figure 3:
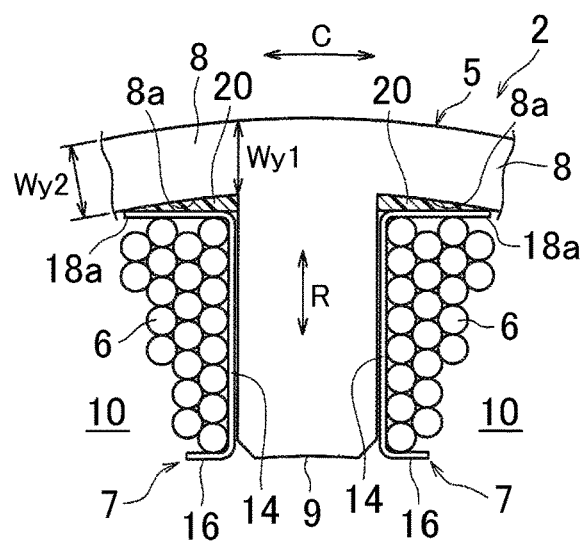
FIG. 3 is an enlarged view of a single tooth of the stator in FIG. 1.

FIG. 3 is an enlarged view of a single tooth 9 of the stator 2 in FIG. 1. The radially outer side wall 18 of the insulator 7 is bent in an L-shape from the main body 14 and extends linearly, with an end portion 18a in the circumferential direction contacting a yoke inside surface 8a. As a result, the circumferential position of the insulator 7 is determined. The yoke inside surface is a surface of the yoke that faces the radially inner side.

In contrast, the yoke inside surface (i.e., a surface that corresponds to a radially outer side bottom surface of a slot 10) 8a that is connected to the tooth 9 extends in the circumferential direction forming an angle that is less than 90° with respect to a side surface of the tooth 9. This yoke inside surface 8a may be a flat surface that is linear or it may be a curved surface that is arc-shaped.

In this way, the radially outer side wall 18 of the insulator 7 has a shape that does not follow the yoke inside surface 8a. Therefore, a triangular gap, for example, is formed between the radially outer side wall 18 of the insulator 7 and the yoke inside surface 8a.

In this example embodiment, a radial width Wy1 of the yoke 8 corresponding to the base end side of the tooth 9 is larger than a radial width Wy2 of the yoke 8 at a position corresponding to a circumferential center region of the slot 10 (i.e., a center region of the slot 10 in the circumferential direction). The circumferential region may be a region that includes the center of the slot 10 and has a predetermined width in the radial direction. Also, the radial width Wy2 may be measured at the center of the slot 10, i.e., at a position equal distance from adjacent teeth. The radial width Wy1 may be measured at a point where the base end of the tooth 9 intersects with a slot. As a result, a gap for adhesive is able to be ensured without affecting the flow of magnetic flux through the yoke 8 from the tooth 9.

An adhesive 20 is filled into the gap between the radially outer side wall 18 of the insulator 7 and the yoke inside surface 8a. The insulator 7 is fixed to the stator core 5 by this adhesive 20. Also, it may be said that the coils 6 are also fixed to the stator core 5 via the insulator 7.

An expanding adhesive is used as the adhesive 20. More specifically, a foaming adhesive that foams and expands by being heated is preferably used. By using the adhesive 20 that expands in this way, the insulator 7 is fixed by the adhesive 20 expanding so as to fill in the gap between the insulator 7 and the yoke 8, so even if there is some variation in the position where the adhesive 20 is attached or the amount of adhesive 20 used, the insulator 7 is able to be stably fixed.

The adhesive 20 is attached to the surface of the radially outer side wall 18 of the insulator 7 before the insulator 7 is assembled to the tooth 9, as will be described later. However, it is not limited to this. That is, the adhesive 20 may also be attached to the yoke inside surface 8a of the stator core 5.

Also, an adhesive sheet that is normally sheet-like and exhibits an adhesive property by being preheated is preferably used as the foaming adhesive 20. This kind of adhesive sheet is advantageous in that it is easy to handle and is able to be used with no variability in the adhesive amount. However, the adhesive 20 is not limited to this, i.e., a foaming adhesive that is normally gel-like may also be used.

Figure 4A:
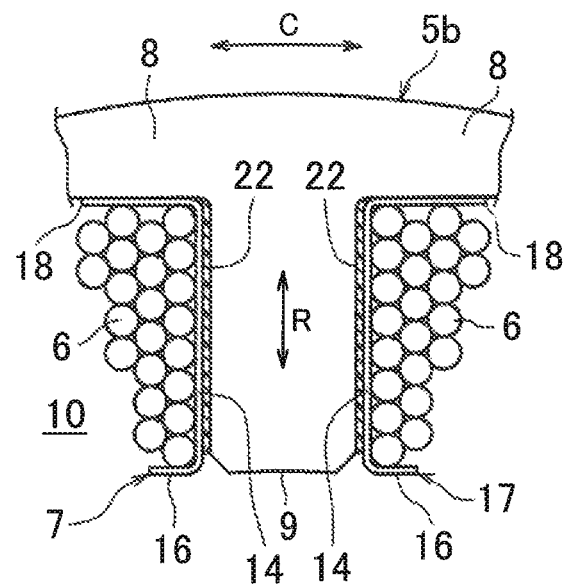
FIG. 4A is a view showing a case in which adhesive is provided between the tooth and the insulator having a wall that follows a yoke.
Figure 4B:
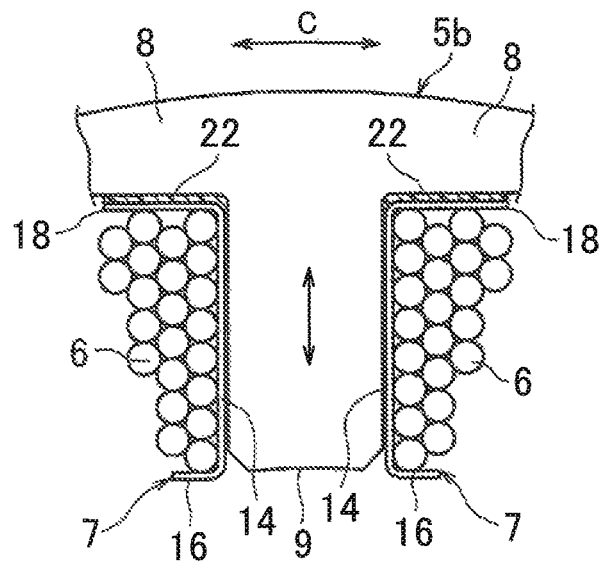
FIG. 4B is a view showing a case in which adhesive is provided between the yoke and the insulator having a wall that follows the yoke.

In this example embodiment, the adhesive 20 is provided only in the gap formed between the yoke 8 and the radially outer side wall 18 of the insulator 7. No adhesive is provided between the tooth 9 and the main body 14 of the insulator 7. If an adhesive 22 is provided between the tooth 9 and the insulator 7 having the radially outer side wall 18 along the yoke 8, as shown in FIG. 4A, the adhesive 22 may end up peeling off when it is attached to the side surface of the tooth 9 or the inside surface of the main body 14 of the insulator 7 and the insulator 7 is assembled. As a result, the fixing strength of the insulator 7 may decrease. On the other hand, when the adhesive 22 is provided between the yoke 8 and the insulator 7 having the radially outer side wall 18 along the yoke 8, as shown in FIG. 4B, the radial length of the main body 14 must be designed shorter taking into account the thickness of the adhesive 22. As a result, the space factor of the coils 6 that occupies the space in the slot 10 will decrease.

In contrast, in this example embodiment, adhesive is not provided between the tooth 9 and the main body 14 of the insulator 7, so when the insulator 7 is inserted and arranged around the tooth 9, the adhesive will contact the tooth surface or the inside surface of the main body 14 of the insulator 7 and will not peel off. In addition, the amount of adhesive used to fix the insulator 7 is able to be reduced, so cost can be reduced. Furthermore, the coil space factor inside the slot 10 will not decrease.

Figure 5:
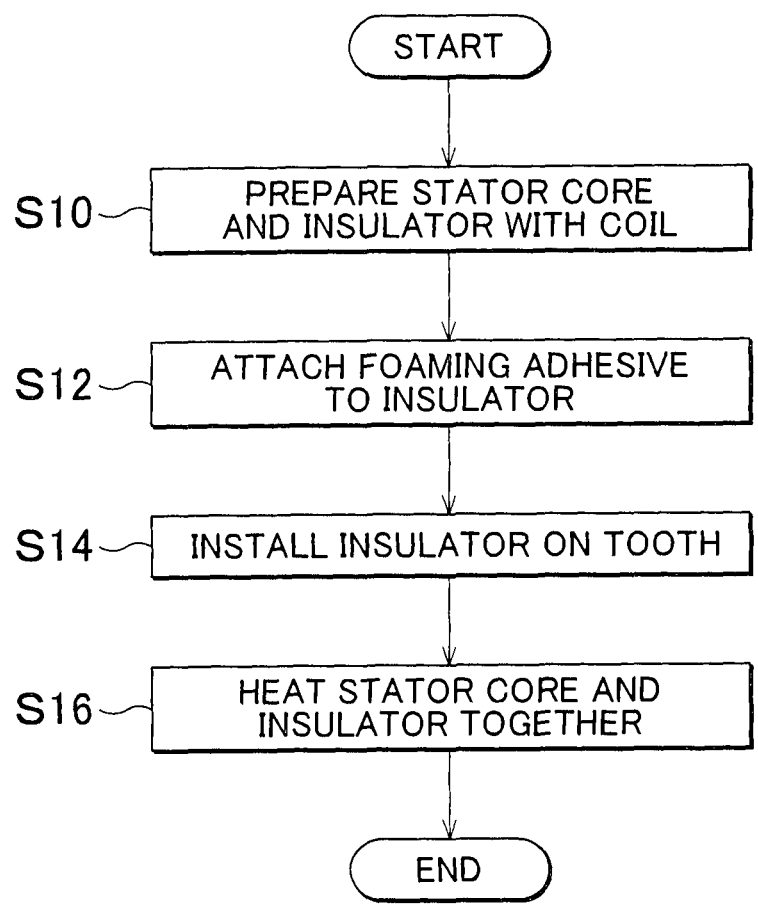
FIG. 5 is a flowchart illustrating a manufacturing method of the stator.

Continuing on, a manufacturing method of the stator 2 having the structure described above will now be described with reference to FIG. 5.

First, the stator core 5 and the insulator 7 around which the coil 6 is wound are prepared (step S10).

Next, the adhesive 20 is attached to the radially outer side wall 18 of the insulator 7 (step S12). At this time, the adhesive 20 is attached to the insulator 7 just as described above after first being preheated so that it exhibits an adhesive property.

Then the insulator 7 is attached to the tooth (step S14). At this time, the insulator 7 is assembled by inserting the main body 14 of the insulator 7 from a tip end of the tooth 9. The tip end is an end portion of the tooth that is on the radially inner side. The base end of the tooth is an end portion of the tooth on the radially outer side, and is a portion that is connected to the yoke.

Lastly, the entire body including the stator core 5, the coil 6, and the insulator 7 is heated to a predetermined temperature (step S16). As a result, the adhesive 20 foams, thus expanding and filling in the gap between the insulator 7 and the yoke 8, such that the insulator 7 is adhered and fixed to the stator core 5. At this time, a jig or the like that restricts the insulator 7 from moving toward the radially inner side from the expansion of the adhesive 20 is preferably used.

As described above, with the stator 2 of this example embodiment, the insulator 7 is fixed by the adhesive 20 expanding so as to fill in the gap formed between the yoke 8 and the radially outer side wall 18 of the insulator 7 that has a shape that does not follow the yoke 8, so even if there is some variation in the position where the adhesive 20 is attached or the amount of adhesive 20 used, the insulator 7 is able to be stably fixed.

Also, the adhesive 20 is not provided between the tooth 9 and the main body 14 of the insulator 7, so when the insulator 7 is inserted and arranged around the tooth 9, the adhesive will not contact the tooth surface (or the inside surface of the insulator main body) and peel off. Furthermore, the amount of adhesive used to fix the insulator 7 is able to be reduced, so cost can be reduced.

The stator and stator manufacturing method according to the invention are not limited to the example embodiments and modified examples thereof described above, but may be improved or modified in any of a variety of ways within the scope and meanings equivalent to the scope of the claims for patent.

Figure 6:
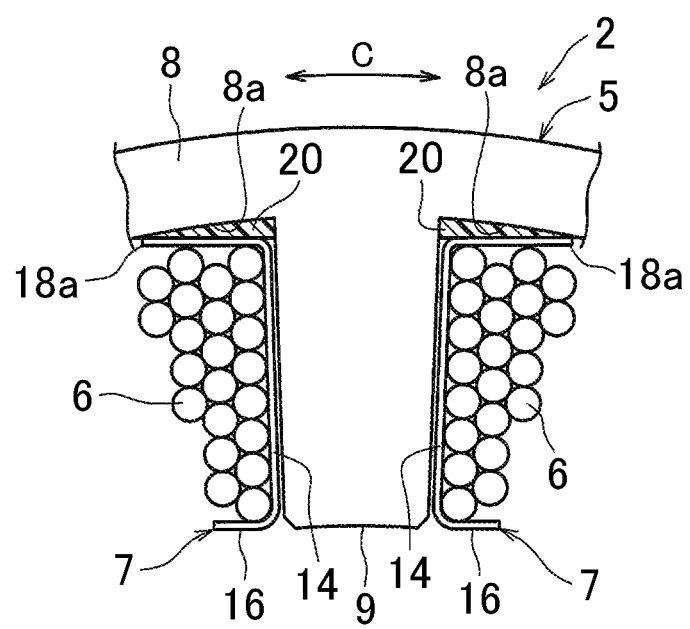
FIG. 6 is a view of a modified example when the tooth has a generally trapezoidal-shaped cross-section.

For example, in the description above, the tooth 9 protrudes in a radial direction with a constant width, but it is not limited to this. For example, the tooth may also be formed in a trapezoidal shape with the width becoming narrower in a tapered shape from the base end side to the tip end side, as shown in FIG. 6.

In the stator according to the invention, the stator core has a slot between two teeth that are adjacent in the circumferential direction, and the insulator may be positioned in the radial direction by a circumferentially end portion of a wall of the insulator abutting against a yoke inside surface that is positioned in a circumferentially center region of the slot.

Also, in the stator according to the invention, the radial width of the yoke that corresponds to the base end side of the tooth may be formed equal to or greater than the radial width of the yoke corresponding to the circumferentially center region of the slot.

Moreover, in the stator, according to the invention, the adhesive may be a foaming adhesive that foams and expands by heat.

What is claimed is:

1. A stator comprising:
    a stator core including:
        a yoke that extends in a circumferential direction; and
        teeth that protrude from the yoke in a radial direction,
            a slot being defined between the teeth which are adjacent to each other;
    an insulator that is assembled to each tooth from a tip end of the tooth, the insulator including:
        a main body within which the tooth is housed; and
        a wall that protrudes in a direction orthogonal to the radial direction from an end portion of the main body, a circumferentially end portion of the wall being configured to abut against an inside surface of the yoke in the slot;
    a coil that is wound around the main body of the insulator; and
    an adhesive that is disposed only in a triangular gap between the yoke and the wall of the insulator, the adhesive being expandable, the adhesive being configured to adhere and fix the insulator to the stator core by expanding to fill in the triangular gap by being heated.

2. The stator according to claim 1, wherein
    the adhesive is a sheet adhesive that is attached to the wall of the insulator or an inside surface of the yoke that corresponds to the triangular gap, before the insulator is assembled.

3. The stator according to claim 1, wherein
a radial width of the yoke that corresponds to a base end side of the tooth is larger than a radial width of the yoke that corresponds to a circumferentially center region of the slot.

4. The stator according to claim 1, wherein
the adhesive is a foaming adhesive that foams and expands by being heated.

5. The stator according to claim 1, wherein
the inside surface is a surface of the yoke that faces a radially inner side at the slot, and
the wall is arranged on an end on a radially outer side of the main body.

6. A manufacturing method for a stator, the stator including a stator core and an insulator, the stator core including a yoke that extends in a circumferential direction and teeth that protrude from the yoke in a radial direction, a slot being defined between the teeth which are adjacent to each other, the insulator including a wall and a main body around which a coil is wound, the wall protruding in a direction substantially orthogonal to the radial direction from an end portion of the main body, the manufacturing method comprising:
preparing the stator core and the insulator;
attaching an adhesive only to the wall of the insulator or only an inside surface of the yoke;
installing the insulator on the tooth so as to form a triangular gap between the wall and the yoke, by abutting a circumferentially end portion of the wall of the insulator against the inside surface of the yoke in the slot;
heating the stator core and the insulator in order to adhere and fix the insulator to the stator core by expanding the adhesive to fill in the triangular gap,
wherein the adhesive is disposed only in the triangular gap.

* * * * *